United States Patent
Iwamoto et al.

(10) Patent No.: US 11,610,334 B2
(45) Date of Patent: Mar. 21, 2023

(54) IMAGE RECOGNITION APPARATUS USING AN OBJECT IMAGE DATA, IMAGE RECOGNITION METHOD USING AN OBJECT IMAGE DATA, AND PROGRAM

(71) Applicant: NEC Corporation, Tokyo (JP)

(72) Inventors: Kota Iwamoto, Tokyo (JP); Soma Shiraishi, Tokyo (JP); Hideo Yokoi, Tokyo (JP); Tsugunori Takata, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/768,724

(22) PCT Filed: Nov. 29, 2018

(86) PCT No.: PCT/JP2018/043939
§ 371 (c)(1),
(2) Date: Jun. 1, 2020

(87) PCT Pub. No.: WO2019/107484
PCT Pub. Date: Jun. 6, 2019

(65) Prior Publication Data
US 2021/0174540 A1  Jun. 10, 2021

(30) Foreign Application Priority Data
Dec. 1, 2017  (JP) .............................. JP2017-231436

(51) Int. Cl.
*G06T 7/73* (2017.01)
*G09G 5/38* (2006.01)
(Continued)

(52) U.S. Cl.
CPC ................ *G06T 7/74* (2017.01); *G06V 10/10* (2022.01); *G09G 5/38* (2013.01); *G06Q 20/201* (2013.01);
(Continued)

(58) Field of Classification Search
CPC ... G06T 7/74; G06T 2207/30204; G06K 9/78; G09G 5/38; G06Q 20/201; G06Q 20/208
See application file for complete search history.

(56) References Cited

U.S. PATENT DOCUMENTS

| 2003/0021492 A1* | 1/2003 | Matsuoka | G06F 3/0386 |
| | | | 382/295 |
| 2010/0158310 A1* | 6/2010 | McQueen | G06Q 10/08 |
| | | | 348/E5.022 |

(Continued)

FOREIGN PATENT DOCUMENTS

| EP | 2472504 A1 | 7/2012 |
| JP | H9-054821 A | 2/1997 |

(Continued)

OTHER PUBLICATIONS

Japanese Office Action for JP Application No. 2019-557316 dated Jul. 13, 2021 with English Translation.

(Continued)

*Primary Examiner* — Yu Chen

(57) ABSTRACT

According to the some non-limiting embodiments, there is provided an information processing apparatus including a display control unit 13 that causes a display provided on a surface on which an object is placed, to display a first image including a predetermined display element, and a conversion rule generation unit 15 that acquires a second image generated by an imaging apparatus having an imaging range including the display and generates a conversion rule for converting coordinates in the image of the imaging apparatus into coordinates in the display, by using a detection result of the display element in the second image.

16 Claims, 24 Drawing Sheets

(51) Int. Cl.
*G06V 10/10* (2022.01)
*G06Q 20/20* (2012.01)

(52) U.S. Cl.
CPC .. *G06Q 20/208* (2013.01); *G06T 2207/30204* (2013.01)

(56) References Cited

U.S. PATENT DOCUMENTS

| | | | | |
|---|---|---|---|---|
| 2011/0167370 | A1* | 7/2011 | Kim | G06F 3/04817 715/769 |
| 2012/0062621 | A1* | 3/2012 | Miyahara | G09G 5/10 345/690 |
| 2012/0249430 | A1* | 10/2012 | Oster | G06F 3/0488 345/173 |
| 2013/0069870 | A1* | 3/2013 | Ichieda | G06F 3/03545 345/157 |
| 2013/0120589 | A1 | 5/2013 | Chang et al. | |
| 2014/0321765 | A1* | 10/2014 | Iwamoto | G06T 9/00 382/243 |
| 2015/0208050 | A1 | 7/2015 | Pawlak et al. | |
| 2017/0017944 | A1* | 1/2017 | Sasahara | G06Q 20/201 |
| 2017/0168651 | A1 | 6/2017 | Ikeda et al. | |
| 2017/0351383 | A1* | 12/2017 | Ikeda | G06F 16/23 |
| 2018/0150699 | A1* | 5/2018 | Yasunaga | G06K 9/209 |

FOREIGN PATENT DOCUMENTS

| | | | |
|---|---|---|---|
| JP | H0954821 | * | 2/1997 |
| JP | 2002-140058 | A | 5/2002 |
| JP | 2003-037855 | A | 2/2003 |
| JP | 2007-135032 | A | 5/2007 |
| JP | 2008-210348 | A | 9/2008 |
| JP | 2008-287426 | A1 | 11/2008 |
| JP | 2013-106347 | A | 5/2013 |
| JP | 2013-122662 | A | 6/2013 |
| JP | 2013-222740 | A | 10/2013 |
| JP | 2015-159524 | A | 9/2015 |
| JP | 2018-051436 | A | 4/2016 |
| JP | 2017-033454 | A | 2/2017 |
| TW | 200935354 | A | 8/2009 |
| WO | WO-2011/024232 | A1 | 3/2011 |
| WO | WO-2017/126253 | A1 | 7/2017 |

OTHER PUBLICATIONS

Japanese Office Action for JP Application No. 2019-557316 dated Apr. 13, 2021 with English Translation.
Japanese Office Action for JP Application No. 2019-557316 dated Jan. 19, 2021 with English Translation.
Taiwanese Office Action for TW Application No. 107142849 dated Jan. 29, 2021 with English Translation.
International Search Report corresponding to PCT/JP2018/043939, dated Jan. 8, 2019 (5 pages).
Miki, Yohei, Miyahara, Koji, "Brightness Measuring Method for Displays wth a Digital Camera," Information Technology R&D Center, Mitsubishi Electric Corporation, IEICE General Conference Information 2012 (2 pages).
JP Office Action for JP Application No. 2021-131708, dated Aug. 16, 2022 with English Translation.
Nishikawa et al., "A Tabletop System utilizing polatization", the 15th interactive systems, and software, Japan, the Japan Society far Software Science and Technology interactive system and a software study group, Dec. 7, 2007, pp. 1-4.

* cited by examiner

IMAGE RECOGNITION APPARATUS USING AN OBJECT IMAGE DATA, IMAGE RECOGNITION METHOD USING AN OBJECT IMAGE DATA, AND PROGRAM

CROSS-REFERENCE TO RELATED APPLICATIONS

This application is a national stage application of International Application No. PCT/JP2018/043939 entitled "INFORMATION PROCESSING APPARATUS, DISPLAY POSITION ADJUSTMENT METHOD, AND PROGRAM," filed on Nov. 29, 2018, which claims priority to Japanese Patent Application No. 2017-231436, filed on Dec. 1, 2017, the disclosures of each which are hereby incorporated by reference in their entirety.

TECHNICAL FIELD

Some non-limiting embodiments relates to a technology for adjusting a position of an element displayed on a display.

There is a technology for recognizing the type, the name, and the like of an object by analyzing an image of the object, which has been generated using an imaging apparatus. For example, Patent Document 1 discloses a technology in which a processing apparatus recognizes a product on a placing table using an image generated by an imaging apparatus facing the placing table of the product, and a projection apparatus projects an image related to check-out processing, onto the recognized product shape and/or a placement surface of the placing table.

RELATED DOCUMENT

Patent Document

BACKGROUND

A configuration in which a result of image recognition processing, for example, "an image related to check-out processing" is displayed on a display provided on the placing table is also considered. However, in order to display the recognition result of an image generated by the imaging apparatus at a correct position on the display, it is necessary to cause the coordinate system of the imaging apparatus to match with the coordinate system of the display.

Some non-limiting embodiments has been made in view of the above problems. One of the objects of the some non-limiting embodiments is to provide a technology in which it is possible to display a recognition result of an object, which is obtained by analyzing an image of the object, at a correct position on a display provided on a surface on which the object is placed.

SUMMARY

According to the some non-limiting embodiments, there is provided an information processing apparatus including a display control unit that causes a display provided on a surface on which an object is placed, to display a first image including a predetermined display element, and a conversion rule generation unit that acquires a second image generated by an imaging apparatus having an imaging range including the display, and generates a coordinate conversion rule for converting coordinates in the image of the imaging apparatus into coordinates in the display by using a detection result of the display element in the second image.

According to the some non-limiting embodiments, there is provided a display position adjustment method executed by a computer, the method including causing a display provided on a surface on which an object is placed, to display a first image including a predetermined display element, acquiring a second image generated by an imaging apparatus having an imaging range including the display, and generating a coordinate conversion rule for converting coordinates in the image of the imaging apparatus into coordinates in the display by using a detection result of the display element in the second image.

According to the some non-limiting embodiments, there is provided a program causing a computer to execute the above-described display position adjustment method.

Advantageous Effects of Invention

According to the some non-limiting embodiments, it is possible to cause a recognition result of an object, which is obtained by analyzing an image of the object, to be displayed at a correct position on a display provided on a surface on which the object is placed.

BRIEF DESCRIPTION OF THE DRAWINGS

The above-described object and other objects, features, and advantages will be further clarified by the preferred example embodiments described below and the following drawings attached thereto.

DESCRIPTION OF EMBODIMENTS

First Example Embodiment

Firstly, an outline of a processing system according to the present example embodiment will be described. In the present example embodiment, the processing system detects an object placed on a placing table by image analysis, and displays a result of the image analysis on a display. It should be noted that, the surface of the placing table, on which the object is placed, serves as a display for displaying information. That is, an object is placed on the display surface of the display, and a result of image analysis is displayed on the display.

Figure 1:
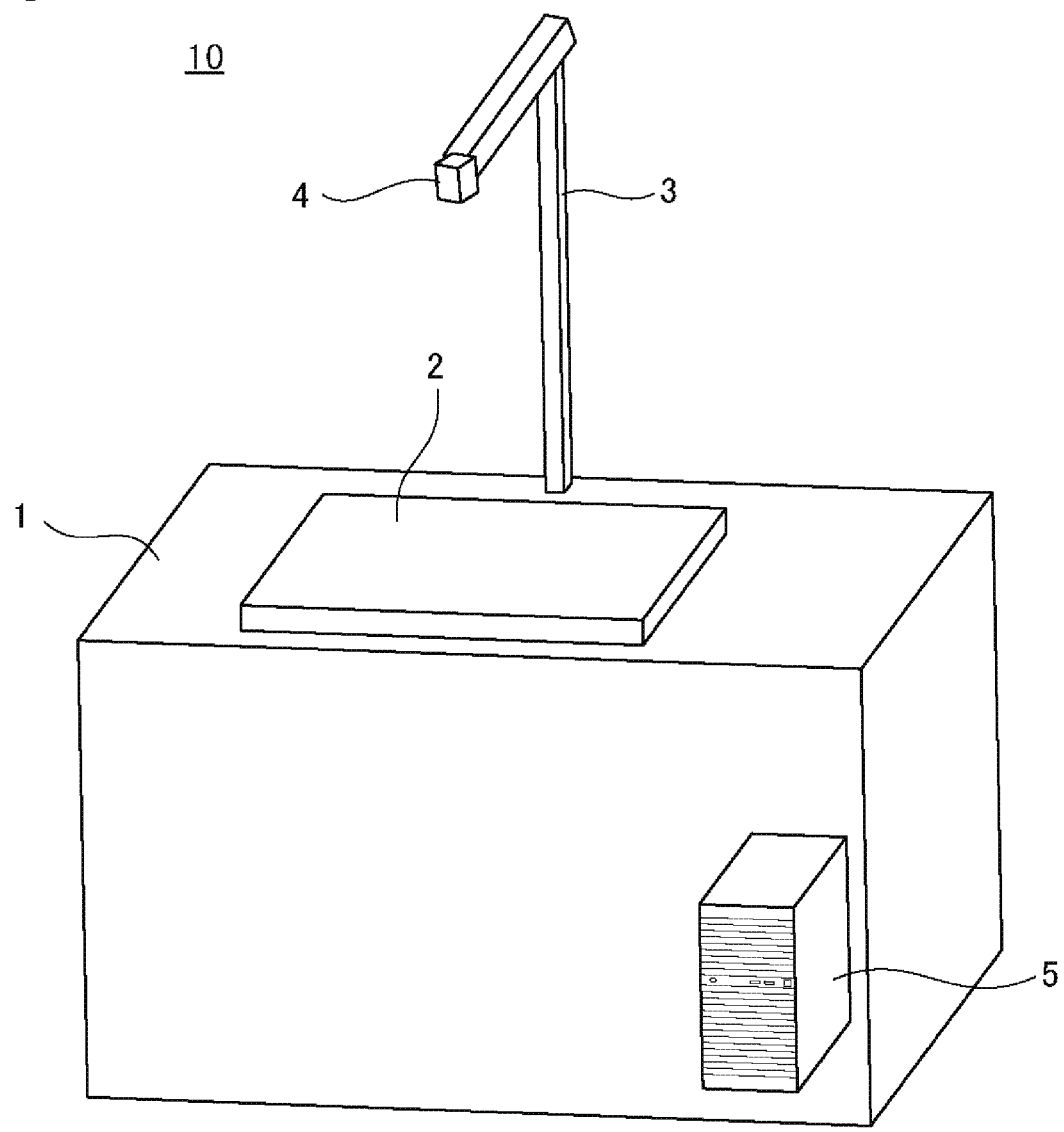
FIG. 1 is a diagram illustrating an example of a hardware configuration of a processing system according to the present example embodiment.

Next, an example of a hardware configuration of the processing system in the present example embodiment will be described with reference to FIG. 1. It should be noted that, the configuration illustrated in FIG. 1 is just an example, and the some non-limiting embodiments is not limited thereto.

A processing system 10 includes a display 2 and an arithmetic operation apparatus 5. The processing system 10 may further include a camera 4.

A display 2 constitutes a portion of a placing table 1 on which an object is placed. The display surface of the display 2 serves as the surface on which the object is placed. In FIG. 1, the surface facing the camera 4 is the display surface. An operator places an object on the display surface of the display 2. Various types of information are displayed on the display surface.

The camera 4 captures an image of the display surface of the display 2. For example, the camera 4 may be attached to a column 3 as illustrated in FIG. 1. The camera 4 may capture a moving image or may capture a still image at a predetermined timing.

The arithmetic operation apparatus 5 acquires image data generated by the camera 4 and analyzes the image data. Then, the arithmetic operation apparatus 5 detects an object placed on the display surface of the display 2. The arithmetic operation apparatus 5 controls the display 2 to display predetermined information. The arithmetic operation apparatus 5 causes the display 2 to display information indicating a position at which where the object is placed.

The display 2 and the arithmetic operation apparatus 5 are communicably connected by any unit. The camera 4 and the arithmetic operation apparatus 5 are communicably connected by any unit.

Next, an example of a hardware configuration of the arithmetic operation apparatus 5 in the present example embodiment will be described. Functions of the arithmetic operation apparatus 5 are implemented by any combination of hardware and software, which mainly include a central processing unit (CPU), a memory, a program loaded onto the memory, a storage unit such as a hard disk, that stores the program (capable of storing a program downloaded from a storage medium such as a compact disc (CD) or from a server and the like on the Internet in addition to a program stored before the apparatus is shipped from the factory), and a network connection interface in any computer. It will be understood by those skilled in the art that there are various modification examples to the implementation method and apparatus.

Figure 2:
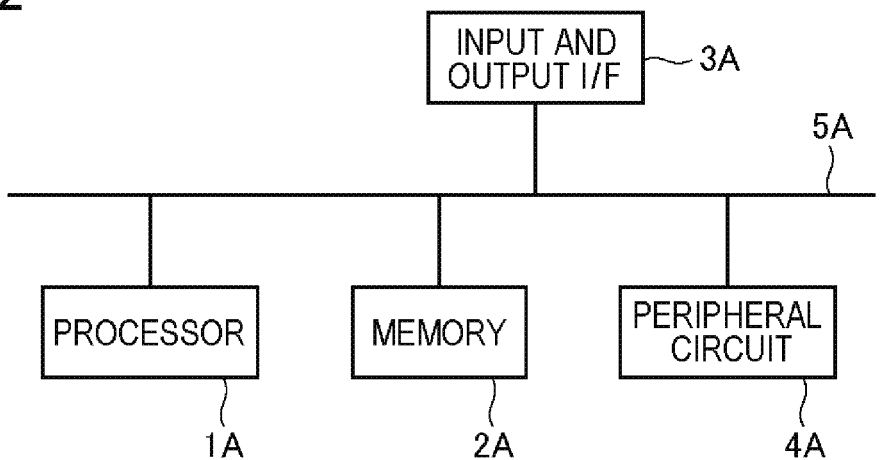
FIG. 2 is a diagram illustrating an example of a hardware configuration of an arithmetic operation apparatus according to the present example embodiment.

FIG. 2 is a block diagram illustrating the hardware configuration of the arithmetic operation apparatus 5. As illustrated in FIG. 2, the arithmetic operation apparatus 5 includes a processor 1A, a memory 2A, an input and output interface 3A, a peripheral circuit 4A, and a bus 5A. The peripheral circuit 4A includes various modules. It should be noted that, the peripheral circuit 4A may not be provided.

The bus 5A is a data transmission path for causing the processor 1A, the memory 2A, the peripheral circuit 4A, and the input and output interface 3A to transmit and receive data to and from each other. The processor 1A is an arithmetic processing device such as a central processing unit (CPU) or a graphics processing unit (GPU). The memory 2A is a memory such as a random access memory (RAM) or a read only memory (ROM), for example. The input and output interface 3A includes, for example, an interface for acquiring information from an input device (for example, keyboard, mouse, and microphone), an external apparatus, an external server, an external sensor, or the like; an interface for outputting information to an output device (for example, display, speaker, printer, and mailer), an external apparatus, an external server, or the like. The processor 1A is capable of issuing a command to each module and performing an arithmetic operation based on an arithmetic operation result of the module.

Figure 3:
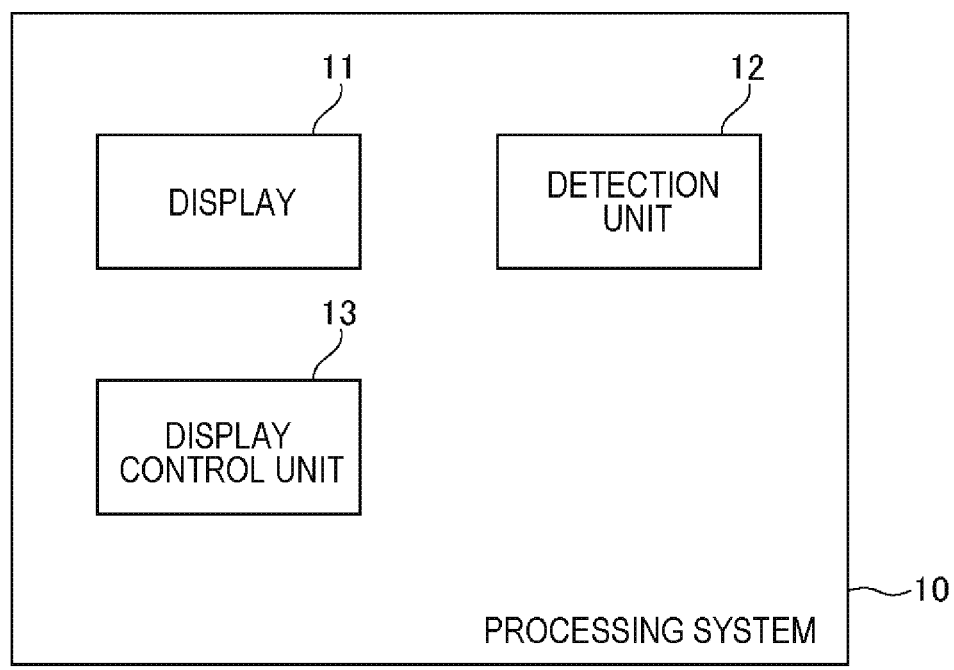
FIG. 3 is a diagram illustrating an example of a functional block diagram of the processing system according to the present example embodiment.

FIG. 3 illustrates an example of a functional block diagram of the processing system 10. As illustrated in FIG. 3, the processing system 10 includes a display 11, a detection unit 12, and a display control unit 13. Here, the correspondence relation with the hardware configuration example in FIG. 2 will be described. The display 11 in FIG. 3 corresponds to the display 2 in FIG. 1. The detection unit 12 and the display control unit 13 in FIG. 3 are provided in the arithmetic operation apparatus 5 in FIG. 1. Functions of the functional units in FIG. 3 will be described below.

The display 11 displays information. An object is placed on a display surface for displaying information.

The detection unit 12 detects an object placed on the display surface of the display 11, based on image data generated by a camera (the camera 4 in FIG. 1) that captures an image of the display surface of the display 11.

Then, the detection unit 12 detects the position of the detected object in the image. For example, the detection unit 12 may indicate the position in the image in a two-dimensional image coordinate system in which a certain point in the image is set as an origin, and any directions are set as an x-axis and a y-axis.

The detection unit 12 converts the position of the detected object in the image into a position (placement position) on the display surface of the display 11 based on a "conversion rule for converting the position in the image into the position on the display surface of the display 11", which is held in advance. For example, the detection unit 12 may indicate the position on the display surface of the display 11 in a two-dimensional display surface coordinate system in which a certain point on the display surface of the display 11 is set as an origin, and any directions are set as an x-axis and a y-axis. The detection unit 12 may convert the position of the detected object in the image into the position (placement position) on the display surface of the display 11 based on a conversion rule (for example, projection conversion matrix) for converting coordinates in the two-dimensional image coordinate system into coordinates in the two-dimensional display surface coordinate system. The position and orientation of the display 11, and the position and orientation of the camera capturing an image of the display surface of the display 11 are fixed. The conversion rule is a rule for converting a position in an image into a position on the display surface of the display 11 under this state.

Figure 4:
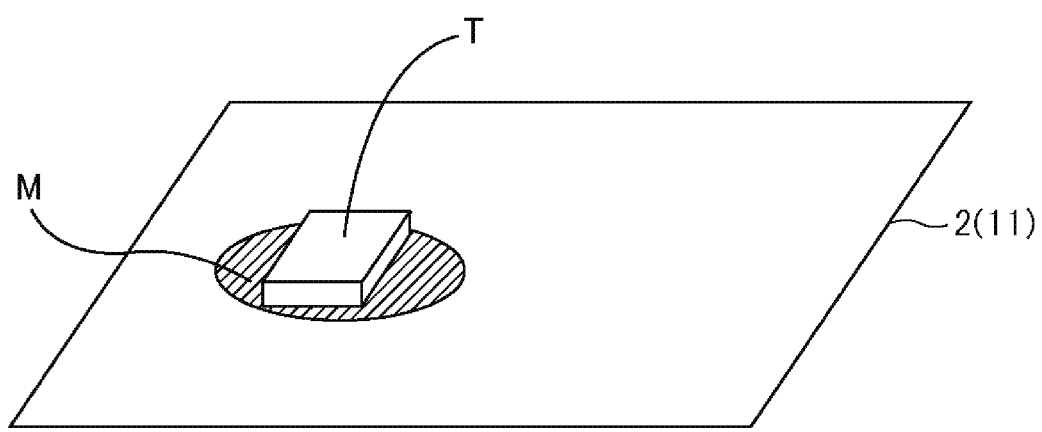
FIG. 4 is a diagram illustrating an example of a display realized by the processing system in the present example embodiment.

The display control unit 13 causes the display 11 to display information indicating the placement position of the detected object. For example, the display control unit 13 may cause the display 11 to display predetermined information in association with the placement position. FIG. 4 illustrates an example.

Figure 23:
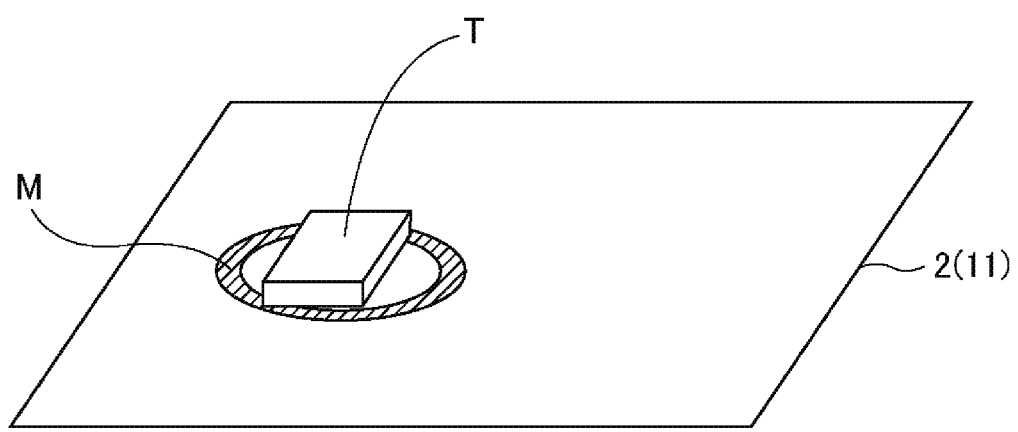
FIG. 23 is a diagram illustrating still another example of the display realized by the processing system in the present example embodiment.

In the example illustrated in FIG. 4, one object T is placed on the display surface of the display 11. A mark M indicating the placement position of the object T is displayed on the display surface of the display 11. The mark M illustrated in FIG. 4 is a frame surrounding the placement position, and the inside of the mark M is painted with a predetermined color. It should be noted that, as illustrated in FIG. 23, the mark M may be a frame having an inside which is not painted.

Figure 5:
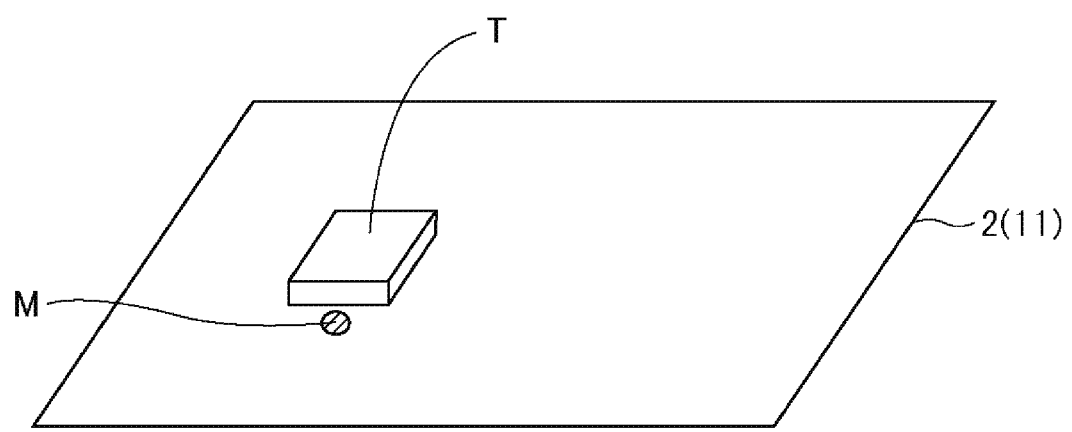
FIG. 5 is a diagram illustrating another example of the display realized by the processing system in the present example embodiment.

As illustrated in FIG. 5, the display control unit 13 may cause predetermined information (mark M) to be displayed at a predetermined position around the placement position of the object T. For example, the display control unit 13 may cause the predetermined information to be displayed at a position (around the placement position) having a predetermined positional relation with the placement position. As an example, the display control unit 13 may cause the predetermined information (mark M) to be displayed at a position obtained by moving from the placement position (or representative point of the placement position) on the display surface of the display 11 by a predetermined amount in a predetermined direction.

It should be noted that, the mark M is not limited to those illustrated in FIGS. 4 and 5, and may be configured with other figures, characters, numbers, symbols, and the like.

In the example illustrated in FIGS. 4 and 5, only one object is placed on the display surface of the display 11, but a plurality of objects may be simultaneously placed on the display surface of the display 11. In this case, the display control unit 13 may set a form (for example, color, shape, size, information, and display position) of the mark M to be displayed in association with each object to differ from each other. In this manner, it is easy to perform identification.

Figure 6:
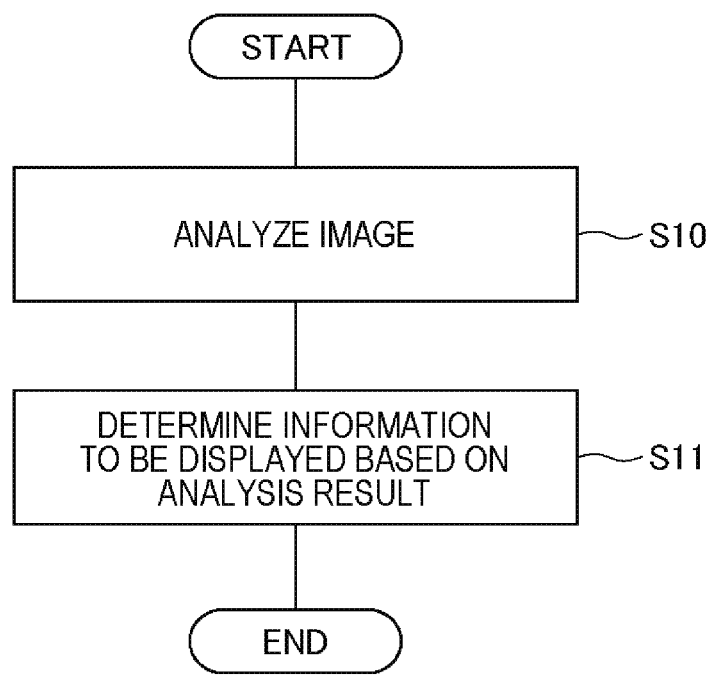
FIG. 6 is a flowchart illustrating an example of a processing flow of the processing system according to the present example embodiment.

Next, an example of a processing flow of the processing system 10 in the present example embodiment will be described with reference to the flowchart of FIG. 6.

In S10, the detection unit 12 analyzes image data generated by the camera capturing an image of the display surface of the display 11. With the analysis, the detection unit 12 detects an object placed on the display surface of the display 11. The detection unit 12 detects the position of the detected object in the image. The detection unit 12 converts the position of the detected object in the image into a position (placement position of the object) on the display surface of the display 11, based on a conversion rule held in advance.

In S11, the display control unit 13 determines information to be displayed on the display 11 based on the analysis result in S10. The display control unit 13 causes the display 11 to display, for example, a mark M indicating the placement position of the object T, as illustrated in FIG. 4 or 5.

It should be noted that, the camera capturing an image of the display 11 may continuously capture a moving image. The detection unit 12 may continuously analyze the moving image. If the detection unit 12 detects the object, the display control unit 13 may cause the display 11 to display predetermined information in response.

The detection unit 12 may track the movement of the detected object and monitor a change in the placement position of the object. The display control unit 13 may change a display position of the information indicating the placement position of the object, in accordance with the change of the placement position of the object.

Figure 12:
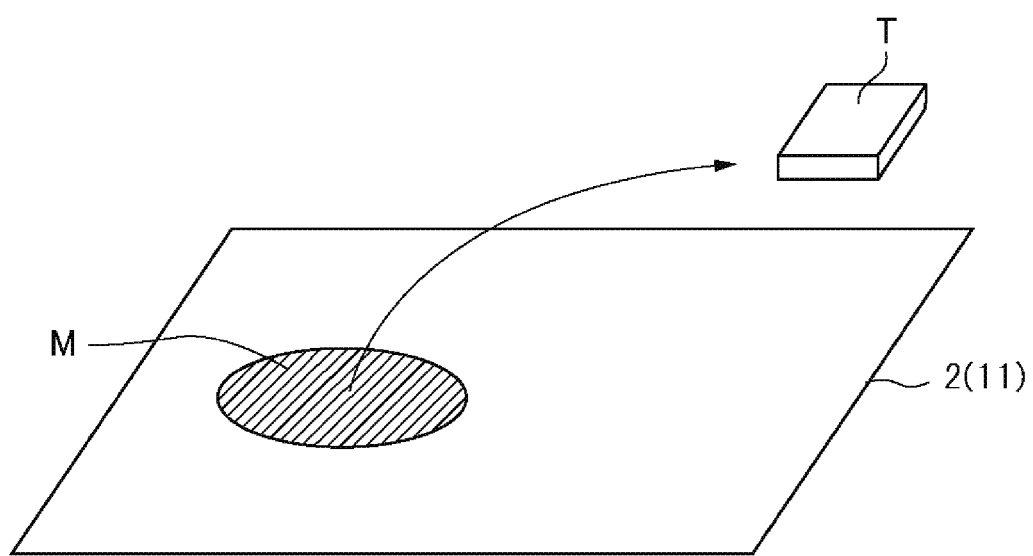
FIG. 12 is a diagram illustrating still another example of the display realized by the processing system in the present example embodiment.

In a case where the detected object moves and disappears from a camera angle of view, the display control unit 13 may immediately end displaying of the information indicating the placement position of the object in response to the detection of the disappearance, or may stop the displaying of the information indicating the placement position of the object after a predetermined time has elapsed from the detection of the disappearance. In the latter case, as illustrated in FIG. 12, the information indicating the placement position of the object is continuously displayed for a predetermined period after the object is moved off the display 11.

According to the above-described processing system 10 in the present example embodiment, the operator can recognize the result of image analysis based on the information displayed on the display.

In the processing system 10 in the present example embodiment, the surface on which the object is placed serves as the display surface of the display 11. Thus, in any time when the operator performs a work of placing the object at a predetermined position and when the operator recognizes the result of image analysis, a direction in which the operator faces is a direction of the display surface of the display 11. In such a case, the operator does not need to perform any troublesome work such as changing a facing direction for each work. As a result, it is possible to cause the work to proceed efficiently.

Second Example Embodiment

A processing system 10 in the present example embodiment is different from the processing system in the first example embodiment in that the type of object is recognized, and information corresponding to the recognition result is displayed on the display 11.

An example of the hardware configuration of the processing system 10 is similar to that in the first example embodiment. An example of the functional block diagram of the processing system 10 is illustrated in FIG. 3, similar to the first example embodiment. As illustrated in FIG. 3, the processing system 10 includes a display 11, a detection unit 12, and a display control unit 13. The configuration of the display 11 is similar to that in the first example embodiment.

The detection unit 12 recognizes the type of object placed on the display surface of the display 11 based on image data. For example, the feature value of an appearance image of each of a plurality of objects is registered in advance. If the detection unit 12 detects an object by analyzing image data, the detection unit 12 recognizes the type of the detected object using the feature value. Other functional components of the detection unit 12 are similar to those in the first example embodiment.

The display control unit 13 sets information to be displayed in association with the placement position of an object having a recognized type to be different from information to be displayed in association with the placement position of an object having a type which has not been recognized. Other components of the display control unit 13 are similar to those in the first example embodiment.

Figure 7:
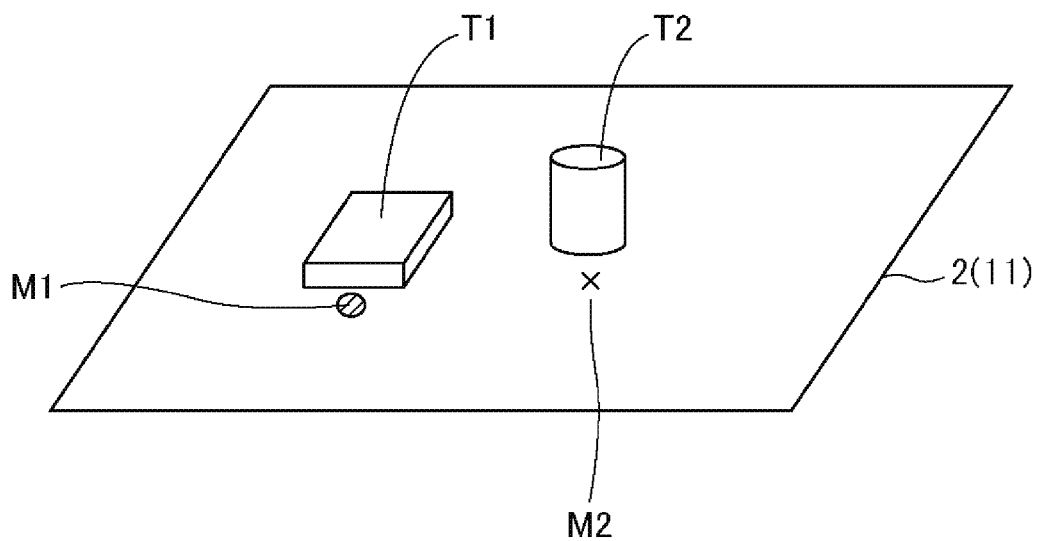
FIG. 7 is a diagram illustrating still another example of the display realized by the processing system in the present example embodiment.

For example, the display control unit 13 may set a form (for example, color, shape, size, information, and display position) of the mark M (see FIGS. 4 and 5) to be displayed in association with the placement position, to be different between a case where the type is recognized and a case where the type is not recognized. FIG. 7 illustrates an example. In this example, the display control unit 13 displays a mark M1 in association with an object having a recognized type, and displays a mark M2 in association with an object having a type which is not recognized. In such a case, the operator visually recognizes the mark M, and thus can recognize "whether or not each object is detected" and "whether or not the type of each object is recognized".

In addition, the display control unit 13 may cause information corresponding to the type of the recognized object to be displayed in association with the placement position of each object. For example, the form (for example, color, shape, size, information, and display position) of the mark M (see FIGS. 4 and 5) to be displayed in association with the placement position may be registered for each type of object in advance. The display control unit 13 may determine the information to be displayed in association with the placement position of each object, based on the registration content and the type of each recognized object. In such a case, the operator visually recognizes the mark M, and thus can recognize "type of the recognized object". The operator may check whether or not image analysis is correctly performed, by comparing the real type of the object and the type of the recognized object to each other.

An example of the processing flow of the processing system 10 in the present example embodiment is similar to that in the first example embodiment.

According to the above-described processing system 10 in the present example embodiment, it is possible to realize advantageous effects similar to those in the first example embodiment. In addition, according to the processing system 10 in the present example embodiment, it is possible to recognize the type of object and cause the display 11 to display useful information corresponding to the recognition result.

Third Example Embodiment

A processing system 10 in the present example embodiment is different from the processing system in the first and second example embodiments in that the shape of object is detected, and information corresponding to the detection result is displayed on the display 11.

An example of the hardware configuration of the processing system 10 is similar to that in the first and second example embodiments. An example of the functional block diagram of the processing system 10 is illustrated in FIG. 3, similar to the first and second example embodiments. As illustrated in FIG. 3, the processing system 10 includes a display 11, a detection unit 12, and a display control unit 13. The configuration of the display 11 is similar to that in the first and second example embodiments.

The detection unit 12 recognizes the shape of a predetermined surface of an object placed on the display surface of the display 11 based on image data. The detection unit 12 may further detect the size of the predetermined surface. Other functional components of the detection unit 12 are similar to those in the first and second example embodiments. The predetermined surface may be a surface facing the camera, a surface abutting on the display 11, or another surface.

The detection unit 12 may extract the contour of the predetermined surface by image analysis, and recognize the shape or the size of the predetermined surface based on the extracted contour. In addition, the shape or the size of the predetermined surface may be registered in advance for each type of object. The detection unit 12 may recognize the type of object placed on the display surface of the display 11, and then may recognize the shape or the size of a predetermined surface, which is registered in association with the type of the recognized object, with reference to the registered information.

The display control unit 13 causes the display 11 to display a mark having a shape similar to the shape of the predetermined surface. Other components of the display control unit 13 are similar to those in the first and second example embodiments.

Figure 8:
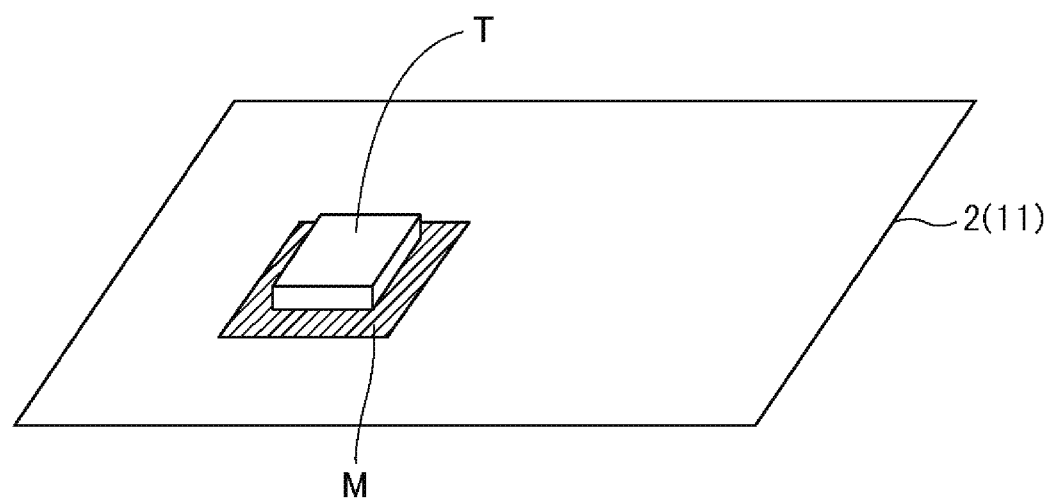
FIG. 8 is a diagram illustrating still another example of the display realized by the processing system in the present example embodiment.

For example, the display control unit 13 may cause the display 11 to display a frame (mark M) having a shape similar to the shape of the predetermined surface, as illustrated in FIG. 8. In the example illustrated in FIG. 8, the predetermined surface is a surface facing the camera or a surface abutting on the display 11.

It should be noted that, the display control unit 13 may cause the display 11 to display the frame (mark M) which has a shape similar to the predetermined surface and is larger than the predetermined surface, as illustrated in FIG. 8.

Although not illustrated, the display control unit 13 may set the shape of the mark M to be displayed at a predetermined position around the placement position illustrated in FIG. 5 to be similar to the shape of the predetermined surface.

The operator can check whether or not the image analysis has been correctly performed, by comparing the real shape of the predetermined surface of the object and the shape of the mark M displayed on the display 11. In addition, as illustrated in FIG. 8, since the size of the mark M is set to be larger than the size of the predetermined surface of the object, it is possible to avoid inconvenience that the mark M is hidden by the object and is difficult to be visually recognized.

An example of the processing flow of the processing system 10 in the present example embodiment is similar to that in the first and second example embodiments.

According to the above-described processing system 10 in the present example embodiment, it is possible to realize advantageous effects similar to those in the first and second example embodiments. In addition, according to the processing system 10 in the present example embodiment, it is possible to recognize the shape or the size of object and cause the display 11 to display useful information corresponding to the recognition result.

Fourth Example Embodiment

A processing system 10 in the present example embodiment is different from the processing system in the first to third example embodiments in that the color of an object is detected, and information corresponding to the detection result is displayed on the display 11.

An example of the hardware configuration of the processing system 10 is similar to that in the first to third example embodiments. An example of the functional block diagram of the processing system 10 is illustrated in FIG. 3, similar to the first to third example embodiments. As illustrated in FIG. 3, the processing system 10 includes a display 11, a detection unit 12, and a display control unit 13. The configuration of the display 11 is similar to that in the first to third example embodiments.

The detection unit 12 detects the color of an object placed on the display surface based on image data. For example, the detection unit 12 may detect a color with which the largest occupied area is filled in an area in which the object is in an image, as the color of the object. Other functional components of the detection unit 12 are similar to those in the first to third example embodiments.

The detection unit 12 may extract the contour of an object by image analysis and determine the color with which the largest occupied area is filled in the contour. In addition, the color of the object may be registered in advance for each type of the object. The detection unit 12 may recognize the type of object placed on the display surface of the display 11, and then may recognize the color registered in association with the type of the recognized object, with reference to the registered information.

The display control unit 13 causes predetermined information (for example, mark M) to be displayed with a color determined based on the detected color of the object. Other components of the display control unit 13 are similar to those in the first to third example embodiments.

For example, the display control unit 13 may cause the predetermined information to be displayed with the same color as the detected color. In such a case, the operator can check whether or not the image analysis has been correctly performed, by comparing the real color of the object and the color of the predetermined information displayed on the display 11.

In addition, the display control unit 13 may cause the predetermined information to be displayed with a color (for example, opposite color) different from the detected color. In such a case, since the object and the predetermined information are clearly distinguished from each other by color, the operator can easily see the predetermined information.

An example of the processing flow of the processing system 10 in the present example embodiment is similar to that in the first to third example embodiments.

According to the above-described processing system 10 in the present example embodiment, it is possible to realize advantageous effects similar to those in the first to third example embodiments. In addition, according to the processing system 10 in the present example embodiment, it is possible to detect the color of an object and cause the display 11 to display useful information corresponding to the detection result.

Fifth Example Embodiment

A processing system 10 in the present example embodiment is different from the first to fourth example embodiments in that, in a case where a plurality of objects are placed close to each other, predetermined information is displayed on the display 11 in a form different from that in a case where the plurality of objects are not placed close to each other. In a case where the plurality of objects are placed close to each other, if predetermined information corresponding to each object is displayed on the display 11, it may be difficult to see the predetermined information. If a display method is changed in this case, it is easy to see the predetermined information even in a case where the plurality of objects are placed close to each other.

An example of the hardware configuration of the processing system 10 is similar to that in the first to fourth example embodiments. An example of the functional block diagram of the processing system 10 is illustrated in FIG. 3, similar to the first to fourth example embodiments. As illustrated in FIG. 3, the processing system 10 includes a display 11, a detection unit 12, and a display control unit 13. The configuration of the display 11 is similar to that in the first to fourth example embodiments.

In a case where the detection unit 12 detects a plurality of placement positions, the detection unit 12 determines whether or not the distance between the placement positions is equal to or smaller than a reference value. Other functional components of the detection unit 12 are similar to those in the first to fourth example embodiments.

The display control unit 13 sets predetermined information to be displayed in association with a plurality of placement positions having a distance from each other which is equal to or smaller than the reference value, to be different from predetermined information to be displayed in association with other placement positions. Other components of the display control unit 13 are similar to those in the first to fourth example embodiments.

For example, the display control unit 13 may set the colors of the predetermined information to be displayed in association with a plurality of placement positions having a distance from each other which is equal to or smaller than the reference value, to be different from each other. It is easy to distinguish plural pieces of predetermined information from each other by separating the colors.

Figure 9:
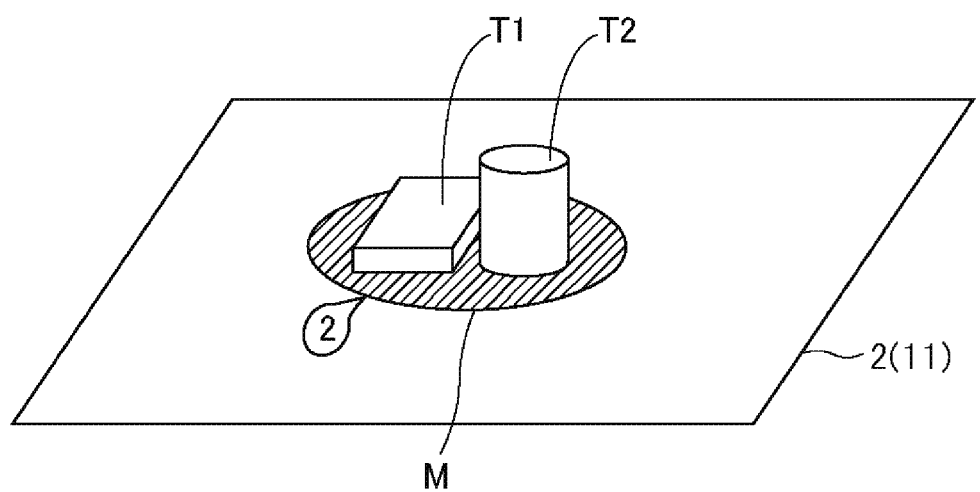
FIG. 9 is a diagram illustrating still another example of the display realized by the processing system in the present example embodiment.

In addition, the display control unit 13 may cause one piece of the predetermined information to be displayed in association with the plurality of placement positions having the distance from each other which is equal to or smaller than the reference value, and cause information indicating the number of the placement positions associated with the predetermined information to be displayed. FIG. 9 illustrates an example. In FIG. 9, one frame (mark M) surrounding two objects T1 and T2 is displayed in association with the two objects T1 and T2. Information N indicating "2" being the number of the placement positions corresponding to the mark M is displayed in association with the mark M.

In addition, the display control unit 13 may cause a multiple frame (predetermined information) to be displayed such that the multiple frame surrounds all of the plurality of placement positions having the distance from each other which is equal to or smaller than the reference value. The display control unit 13 may set the number of layers of frames to be equal to the number of placement positions surrounded by the multiple frame. That is, the frame surrounding the two placement positions may be a double frame, and the frame surrounding M placement positions may be an M-layer frame.

An example of the processing flow of the processing system 10 in the present example embodiment is similar to that in the first to fourth example embodiments.

According to the above-described processing system 10 in the present example embodiment, it is possible to realize advantageous effects similar to those in the first to fourth example embodiments. According to the processing system 10 in the present example embodiment, in a case where a plurality of objects are placed close to each other, it is possible to cause the display 11 to display predetermined information in a form different from that in a case where a plurality of objects are not placed close to each other. In a case where the plurality of objects are placed close to each other, if predetermined information corresponding to each object is displayed on the display 11, it may be difficult to see the predetermined information. If a display method is changed in this case, it is easy to see the predetermined information even in a case where the plurality of objects are placed close to each other.

Sixth Example Embodiment

A processing system 10 in the present example embodiment is different from that in the first to fifth example embodiments in that, in a case where it is not possible to recognize the type of object, a cause for not being recognized is determined, and information corresponding to the determined cause is displayed on the display 11.

An example of the hardware configuration of the processing system 10 is similar to that in the first to fifth example embodiments. An example of the functional block diagram of the processing system 10 is illustrated in FIG. 3, similar to the first to fifth example embodiments. As illustrated in FIG. 3, the processing system 10 includes a display 11, a detection unit 12, and a display control unit 13. The configuration of the display 11 is similar to that in the first to fifth example embodiments.

In a case where it is not possible to recognize the type of object placed on the display surface of the display 11, the detection unit 12 determines a cause for not being recognized. Examples of the cause of the error occurring include "a portion of the object is cut off", "the main surface of the object does not face the camera", and "a plurality of objects overlap each other". The detection unit 12 may determine the causes by image analysis. Other functional components of the detection unit 12 are similar to those in the first to fifth example embodiments.

The display control unit 13 causes the display 11 to display information corresponding to the determined cause. Other components of the display control unit 13 are similar to those in the first to fifth example embodiments.

Figure 24:
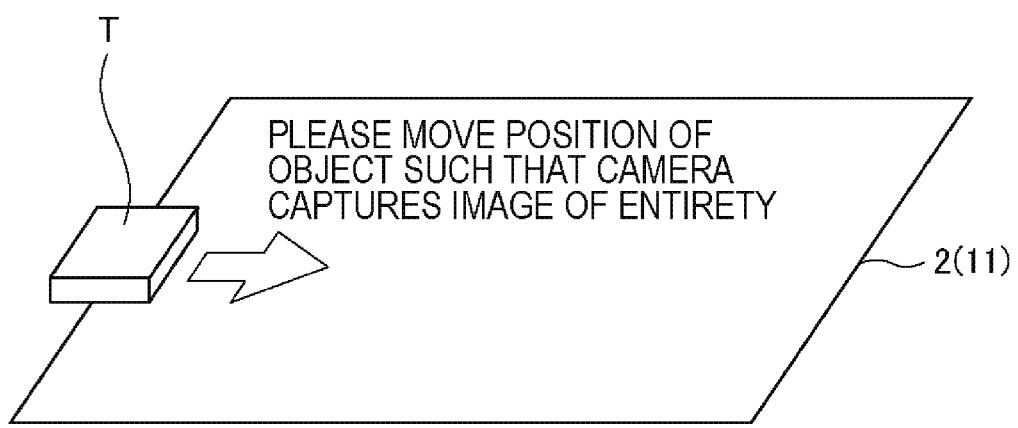
FIG. 24 is a diagram illustrating still another example of the display realized by the processing system in the present example embodiment.

For example, in a case where the cause of the error occurring is "a portion of the object is cut off" as illustrated in FIG. 24, the display control unit 13 may cause the display 11 to display information indicating that "please move the position of the object such that the camera captures an image of the whole object". Alternatively, the display control unit 13 may cause the display 11 to display information (arrow illustrated in FIG. 24) indicating a direction in which the object is moved, instead of or in addition to the information. In addition, although not illustrated, in a case where the cause of the error occurring is "a portion of the object is cut off", the display control unit 13 may cause the display 11 to display information indicating that "please move the position of the object such that the camera captures an image of the whole object". In a case where the cause of the error occurring is "the main surface of the object does not face the camera", the display control unit 13 may the display 11 to display information indicating that "please direct the product name of the object to the camera". In a case where the cause of the error occurring is "a plurality of objects overlap each other", the display control unit 13 may cause the display 11 to display information indicating that "please do not overlap the objects".

An example of the processing flow of the processing system 10 in the present example embodiment is similar to that in the first to fifth example embodiments.

According to the above-described processing system 10 in the present example embodiment, it is possible to realize advantageous effects similar to those in the first to fifth example embodiments. In addition, according to the processing system 10 in the present example embodiment, in a case where it is not possible to recognize the type of object, it is possible to determine the cause and cause the display 11 to display guidance corresponding to the determined cause.

Seventh Example Embodiment

A processing system 10 in the present example embodiment is different from the first to sixth example embodiments in that the processing system 10 is limited to being used as a point of sales (POS) register for registering a product. It may be assumed that the POS register is operated by a clerk or is operated by a customer.

Figure 10:
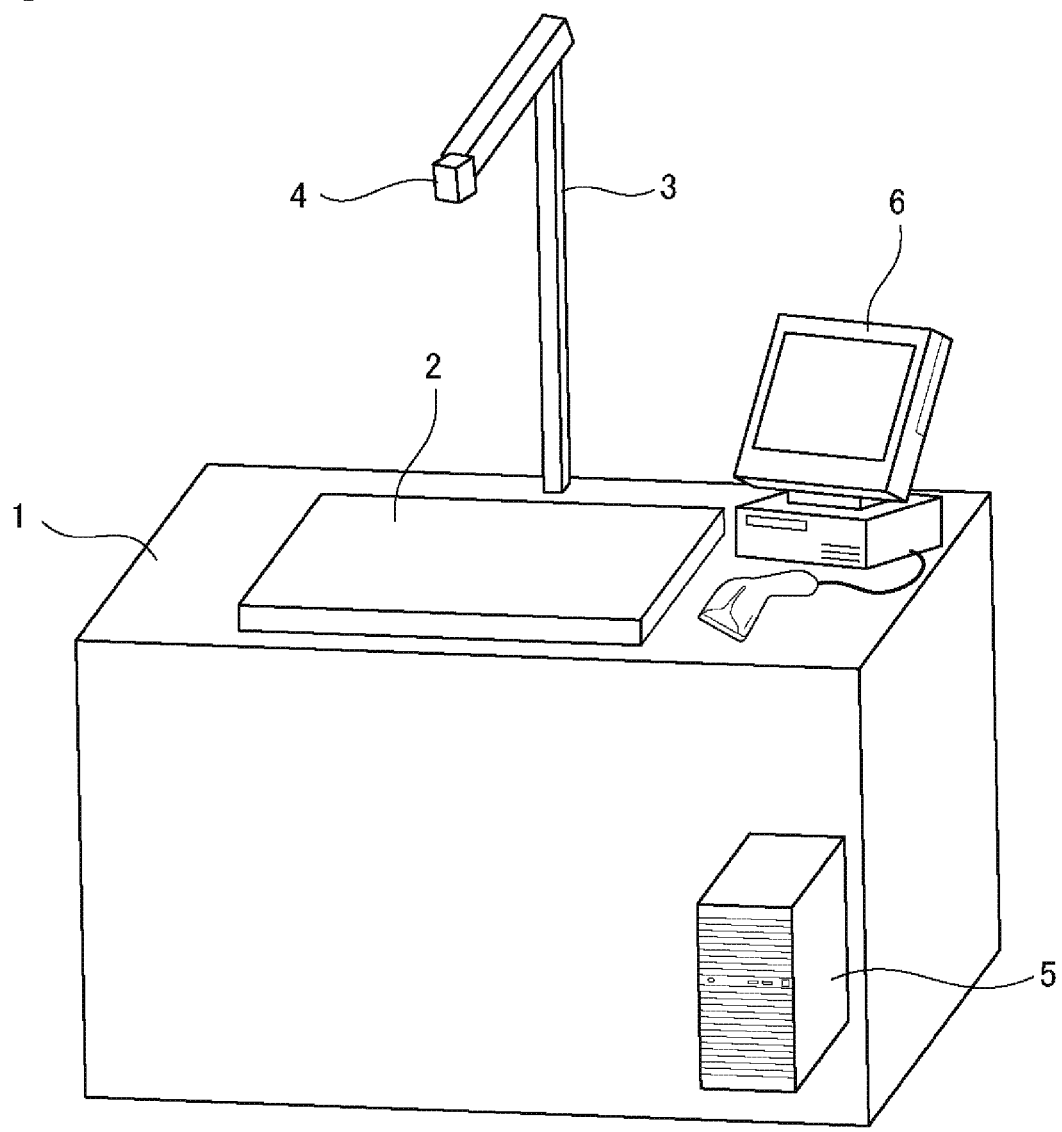
FIG. 10 is a diagram illustrating an example of a hardware configuration of a processing system according to the present example embodiment.

FIG. 10 illustrates an example of the hardware configuration of the processing system 10. The processing system 10 in this example embodiment is different from the first to sixth example embodiments in that the processing system 10 includes a registration apparatus 6.

In the present example embodiment, a product (object) as a check-out target is placed on the display 2. If the type of product placed on the display 2 is recognized by image analysis, the arithmetic operation apparatus 5 transmits a recognition result to the registration apparatus 6. The registration apparatus 6 registers the product type recognized by the arithmetic operation apparatus 5, as the check-out target. The registration apparatus 6 may display the registered product type on a display different from the display 2. The registration apparatus 6 may acquire product information (including a unit price and the like) from a server and compute a purchase amount.

Figure 11:
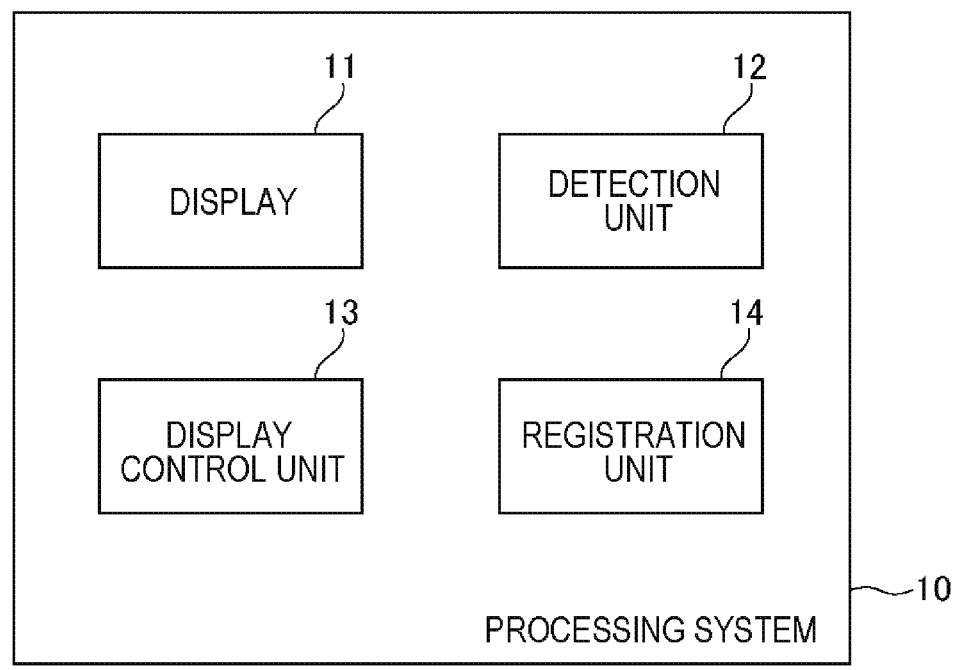
FIG. 11 is a diagram illustrating an example of a functional block diagram of the processing system according to the present example embodiment.

FIG. 11 illustrates an example of the functional block diagram of the processing system 10. As illustrated in FIG. 11, the processing system 10 includes a display 11, a detection unit 12, a display control unit 13, and a registration unit 14. The configurations of the display 11 and the detection unit 12 are similar to those in the first to sixth example embodiments.

The registration unit 14 registers the product type recognized by the detection unit 12, as a check-out target.

The display control unit 13 may cause the display 11 to display at least one of the name of the recognized product, the price of the product, and an advertisement of a product related to the product, in association with each product. Other components of the display control unit 13 are similar to those in the first to sixth example embodiments. Related products may be products of the same type as each product, or may be products that are often purchased with each product.

The operator may check whether each product is correctly recognized, based on the displayed product name.

In addition, the display control unit 13 may change the information to be displayed on the display 11 for each of states before the start of product identification, during the product identification, and after the settlement. The detection of the state may be performed by image analysis by the detection unit 12 or may be performed based on the content input to the registration apparatus 6.

It should be noted that, the application examples of the processing system 10 described in the first to sixth example embodiments are not limited to those described in the seventh example embodiment. For example, the processing system 10 may be used for inspection of goods or products.

Eighth Example Embodiment

In order to display the recognition result obtained by analyzing an image of an object on the placing table, at a correct position on the display 11, it is necessary to cause the coordinate system of the image generated by the camera 4 to match with the coordinate system of the display surface of the display 11. In the present example embodiment, a configuration for solving such a problem will be described.

A processing system 10 in the present example embodiment is different from the first to seventh example embodiments in that the processing system 10 has a function to generate "the coordinate conversion rule for converting a position in an image into a position on the display surface of the display 11", which is described in the first example embodiment.

Figure 13:
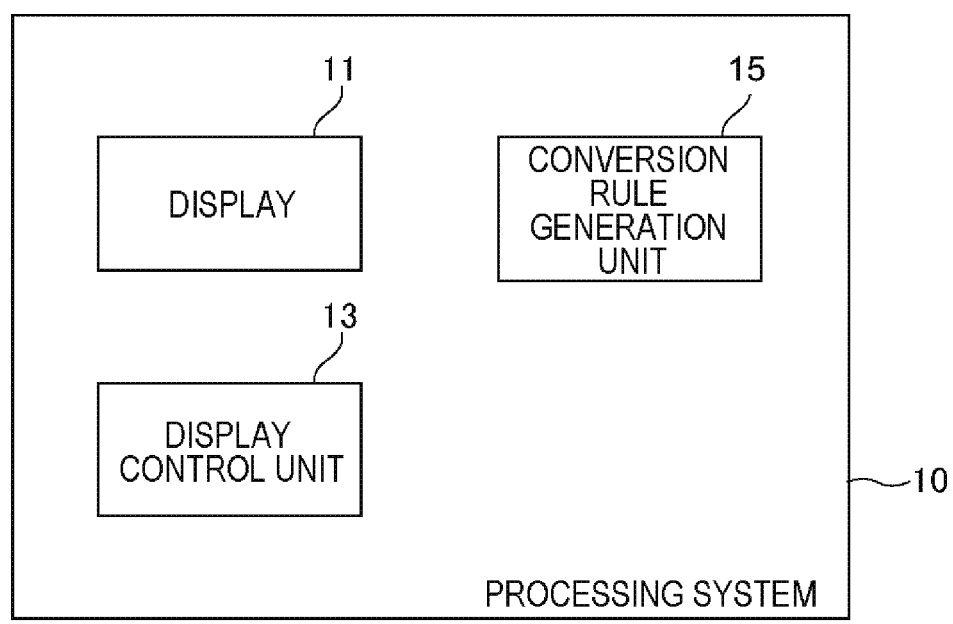
FIG. 13 is a block diagram illustrating an example of a functional configuration of a processing system according to the eighth example embodiment.

FIG. 13 is a block diagram illustrating an example of the functional configuration of the processing system 10 according to the eighth example embodiment. As illustrated in FIG. 13, the processing system 10 in the present example embodiment includes a display control unit 13 and a conversion rule generation unit 15. The display control unit 13 and the conversion rule generation unit 15 in the processing system 10 are provided in the arithmetic operation apparatus 5 (information processing apparatus) in FIG. 1, for example. Although not illustrated, the processing system 10 may further have the configuration of each of the above example embodiments.

In the present example embodiment, the display control unit 13 causes a display provided on a surface on which an object is placed, to display an image (also described as "a first image" below) including a predetermined display element. The conversion rule generation unit 15 uses the predetermined display element displayed on the display to generate a rule (coordinate conversion rule) allowing conversion of coordinates of an image generated by an image capturing apparatus such as the camera 4 into coordinates on the display surface of the display 11. Firstly, the conversion rule generation unit 15 acquires an image (also described as "a second image" below) obtained by the camera 4 capturing an image of the display 11 displaying the above-described first image. Here, the camera 4 is disposed, for example, above the display 11 as illustrated in FIG. 1 and includes the display 11 in an imaging range. The conversion rule generation unit 15 generates the coordinate conversion rule for converting the coordinates of an image generated by the camera 4 into the coordinates on the display 11 by using the detection result of the display element in the second image.

The advantageous effects of the processing system 10 in the present example embodiment will be described. In the present example embodiment, firstly, the first image including a predetermined display element is displayed on the display. Then, the camera 4 generates a second image including the first image displayed on the display, as a subject. The display element of the first image is detected by analyzing the second image. The coordinate conversion rule between the first image and the second image is generated using the detection result of the display element in the second image. Since the coordinate conversion rule generated in this manner is used, it is possible to display an analysis result (recognition result, recognition position, and the like of an object) of an image of the object placed on the display, on the display with being aligned with the position of the object.

The present example embodiment will be more specifically described below.

Figure 14:
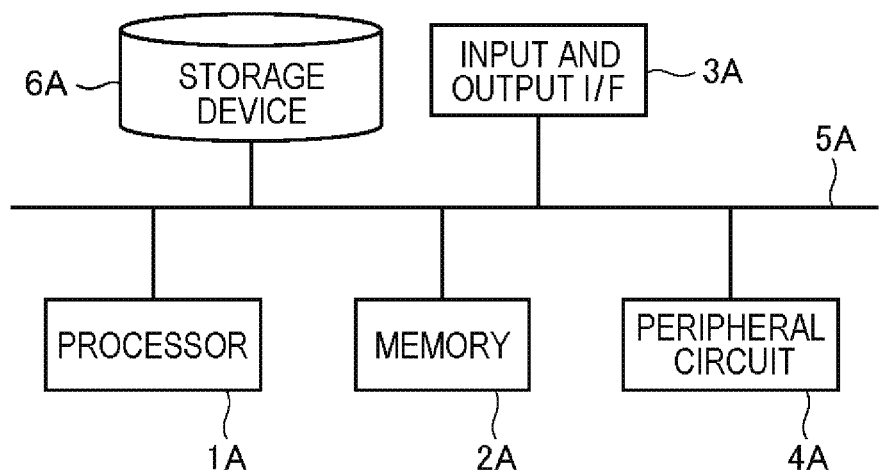
FIG. 14 is a block diagram illustrating a hardware configuration of an arithmetic operation apparatus in the present example embodiment.

FIG. 14 is a block diagram illustrating a hardware configuration of the arithmetic operation apparatus 5 in the present example embodiment. In FIG. 14, a storage device 6A is further provided. The storage device 6A in the present example embodiment stores program modules for realizing the functions of the display control unit 13 and the conversion rule generation unit 15 described above. The functions of the display control unit 13 and the conversion rule generation unit 15 described above are realized in a manner that the processor 1A reads the program modules onto the memory 2A and executes the program modules. It should be noted that, the processor 1A, the memory 2A, the input and output interface 3A, the peripheral circuit 4A, and the bus 5A are as described in the first example embodiment.

Figure 15:
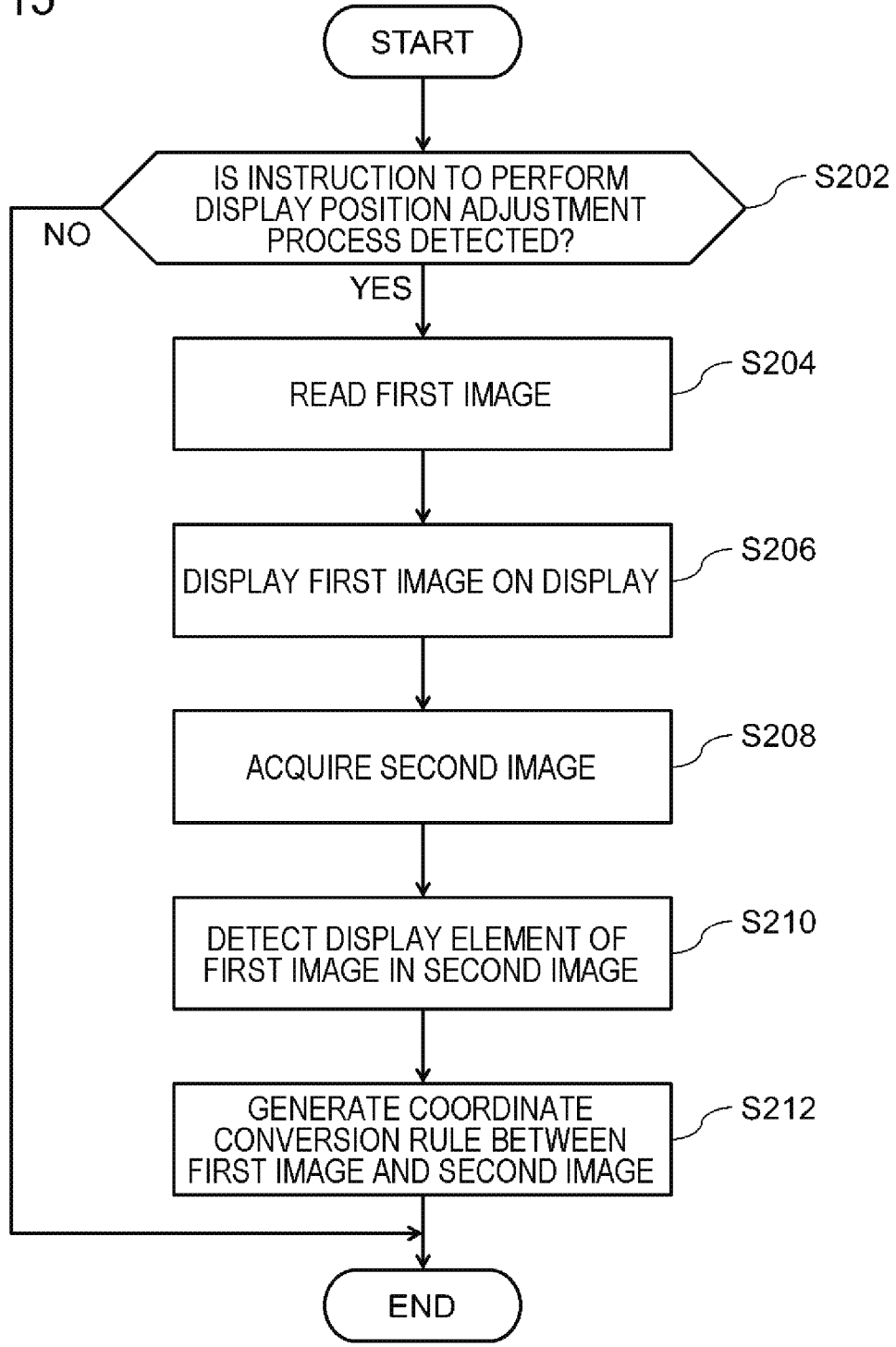
FIG. 15 is a flowchart illustrating a flow of a display position adjustment process performed by the processing system according to the eighth example embodiment.

FIG. 15 is a flowchart illustrating a flow of a display position adjustment process performed by the processing system 10 according to the eighth example embodiment.

Firstly, the display control unit 13 determines whether or not an instruction to perform the display position adjustment process has been detected (S202). As an example, the instruction to perform the display position adjustment process is generated in response to a user operation (for example, pressing a predetermined button displayed on a screen (not illustrated)) and is transmitted to the display control unit 13. As another example, the instruction to perform the display position adjustment process may be automatically generated in accordance with a preset schedule. As still another example, the instruction to perform the display position adjustment process may be automatically generated in a case where an operation (for example, movement of an object placed on the display 11 or switching of display contents on the display 11) on the display 11 is not performed for a predetermined period or longer.

In a case where the display control unit 13 does not detect an instruction to perform the display position adjustment process (S202: NO), processing described below is not performed. On the other hand, in a case where the instruction to perform the display position adjustment process is detected (S202: YES), the display control unit 13 reads a first image (S204). The first image is stored in advance in the storage device 6A, for example. The display control unit 13 causes the display 11 connected via the input and output interface 3A to display the first image read from the storage device 6A or the like (S206). Some specific examples of the first image displayed by the display control unit 13 will be described below.

Specific Examples of First Image

The first image displayed by the display control unit 13 is an image used for generating the coordinate conversion rule for converting coordinates on an image generated by the camera 4 into coordinates on the display surface of the display 11. FIGS. 16 to 21 are diagrams illustrating examples of the first image displayed on the display 11 provided on the placing table 1.

Figure 16:
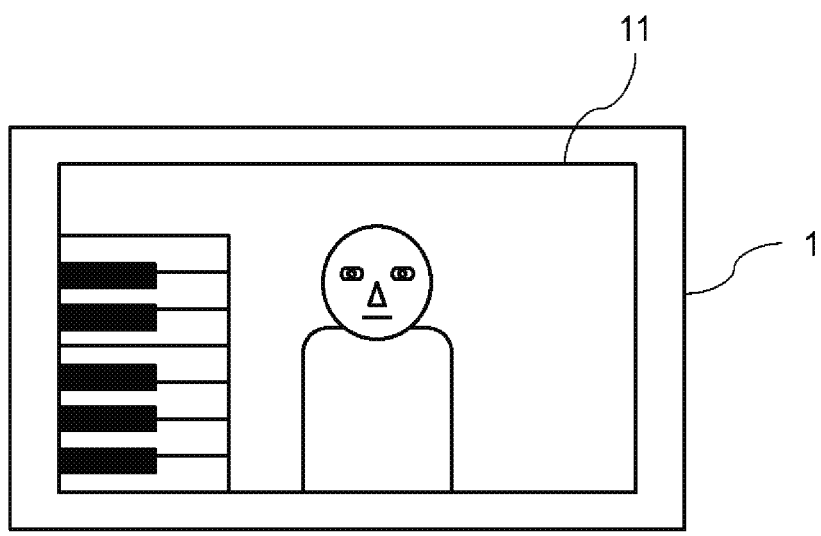
FIG. 16 is a diagram illustrating an example of a first image displayed on a display provided on a placing table.
Figure 17:
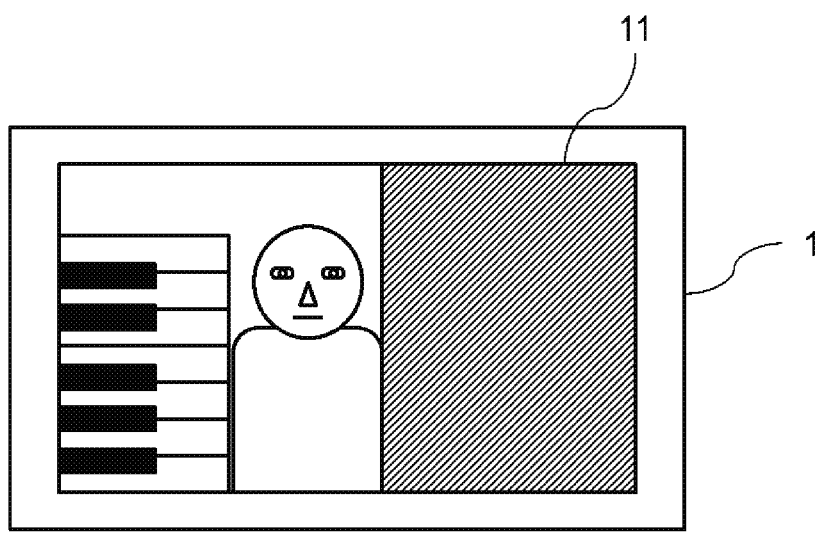
FIG. 17 is a diagram illustrating another example of the first image displayed on the display provided in the placing table.

The first image illustrated in FIGS. 16 and 17 includes a shape different from repetition of a specific pattern, as a predetermined display element. Specifically, the first image includes a display element indicating a unique characteristic, such as a person or an object. Since the first image having a shape different from repetition of the specific pattern is displayed, it is possible to improve detection accuracy of each feature point of a display element in the second image in comparison to a case where the first image having repetition of a specific pattern described later is displayed. It should be noted that, in the example in FIG. 16, the display control unit 13 causes the first image to be displayed in the entire display area of the display 11. In addition, in the example in FIG. 17, the display control unit 13 causes the first image to be displayed on a portion of the display area of the display 11. It should be noted that, the shaded area in FIG. 17 indicates an area in which the first image is not displayed. For example, the display control unit 13 may be configured to display a first image having a size corresponding to an area to which the coordinate conversion rule is applied on the display 11. In this case, in the example in FIG. 16, the entire display area of the display 11 is an application area of the coordinate conversion rule. In addition, in the example in FIG. 17, a partial area of the display 11 is an application area of the coordinate conversion rule.

Figure 18:
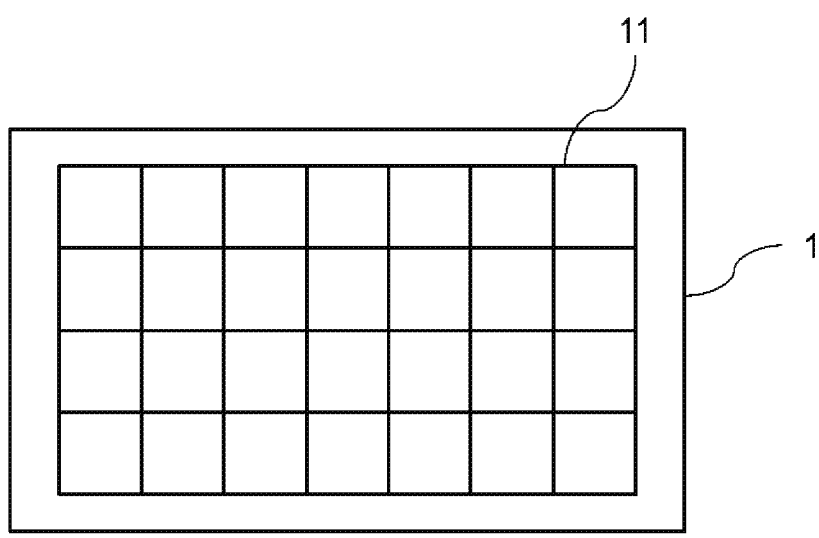
FIG. 18 is a diagram illustrating still another example of the first image displayed on the display provided in the placing table.
Figure 19:
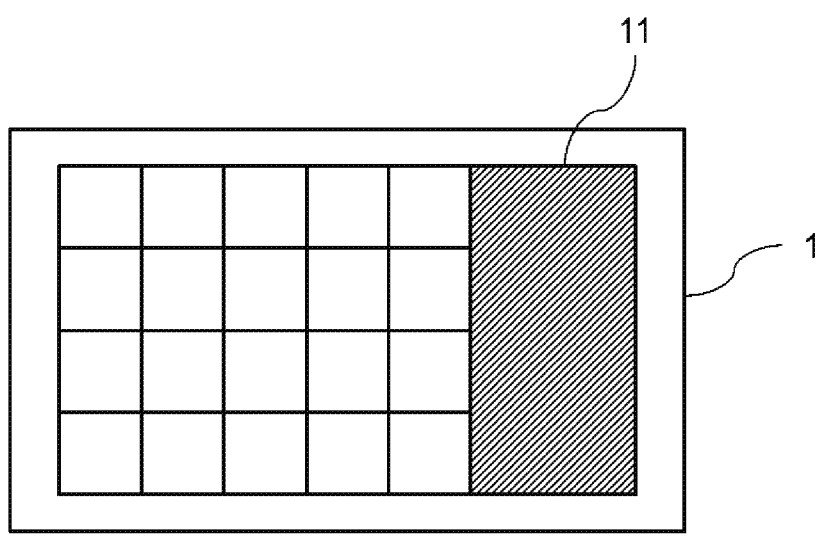
FIG. 19 is a diagram illustrating still another example of the first image displayed on the display provided in the placing table.

The first image illustrated in FIGS. 18 and 19 has a lattice-like pattern being an example of the repetition of a specific pattern, as the predetermined display element. It should be noted that, FIGS. 18 and 19 are examples, and the first image may have repetition of a pattern other than the lattice shape. In the example in FIG. 18, the display control unit 13 causes the first image having the lattice-like pattern to be displayed in the entire display area of the display 11. In the example in FIG. 19, the display control unit 13 causes the first image having the lattice-like pattern to be displayed in the portion of the display area of the display 11. It should be noted that, the shaded area in FIG. 19 indicates an area in which the first image is not displayed. For example, the display control unit 13 may be configured to display a first image having a size corresponding to an area to which the coordinate conversion rule is applied on the display 11. In this case, in the example in FIG. 18, the entire display area of the display 11 is an application area of the coordinate conversion rule. In addition, in the example in FIG. 19, a partial area of the display 11 is an application area of the coordinate conversion rule.

Figure 20:
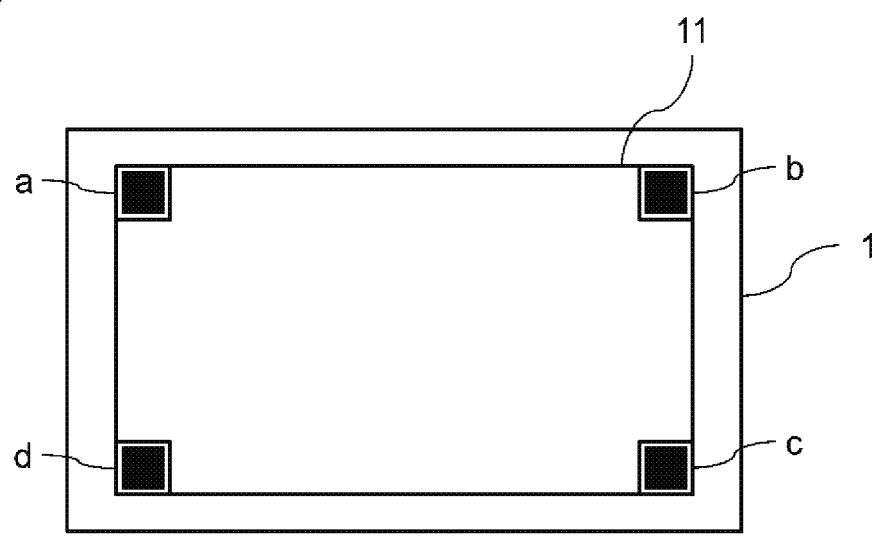
FIG. 20 is a diagram illustrating still another example of the first image displayed on the display provided in the placing table.
Figure 21:
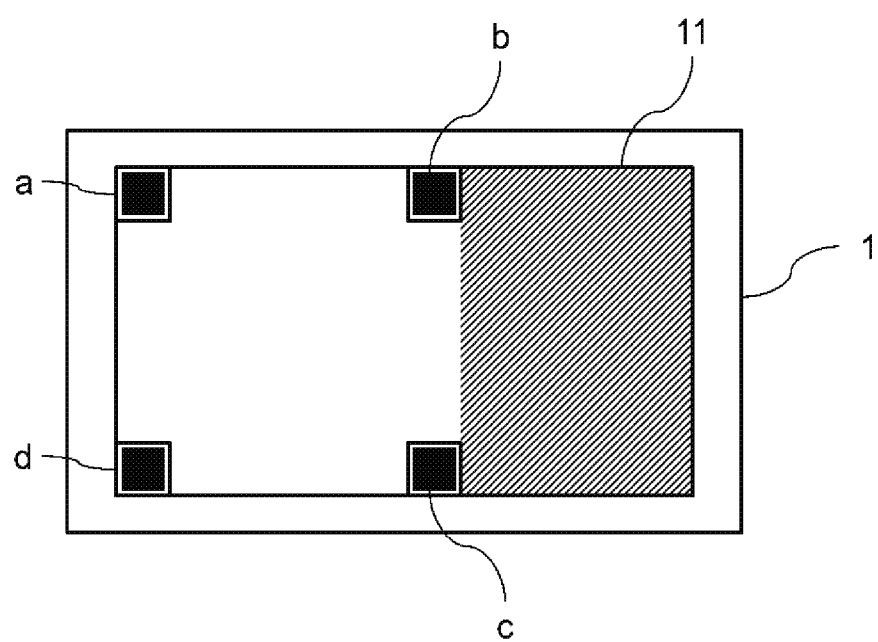
FIG. 21 is a diagram illustrating still another example of the first image displayed on the display provided in the placing table.

The first image illustrated in FIGS. 20 and 21 includes a plurality of marks a, b, c, and d as predetermined display elements. In the examples in FIGS. 20 and 21, the plurality of marks a, b, c, and d indicate positions of a plurality of vertexes of an area to which the coordinate conversion rule is applied on the display 11, respectively. In other words, the first image illustrated in FIGS. 20 and 21 has display elements (plurality of marks a, b, c, and d) in at least a portion of the area to which the coordinate conversion rule is applied. According to the first image illustrated in FIGS. 20 and 21, it is possible to easily recognize an application range of the coordinate conversion rule from the appearance of the image. It should be noted that, FIGS. 20 and 21 are examples, and the first image may have a mark different from the marks illustrated in FIGS. 20 and 21. In the example in FIG. 20, the display control unit 13 causes the first image having a plurality of marks a, b, c, and d to be displayed in the entire display area of the display 11. In the example in FIG. 21, the display control unit 13 causes the first image having a plurality of marks a, b, c, and d to be displayed in a portion of the display area of the display 11. It should be noted that, the shaded area in FIG. 21 indicates an area in which the first image is not displayed. For example, the display control unit 13 may be configured to display a first image having a size corresponding to an area to which the coordinate conversion rule is applied on the display 11. In this case, in the example in FIG. 20, the entire display area of the display 11 is an application area of the coordinate conversion rule. In addition, in the example in FIG. 21, a partial area of the display 11 is an application area of the coordinate conversion rule.

Figure 22:
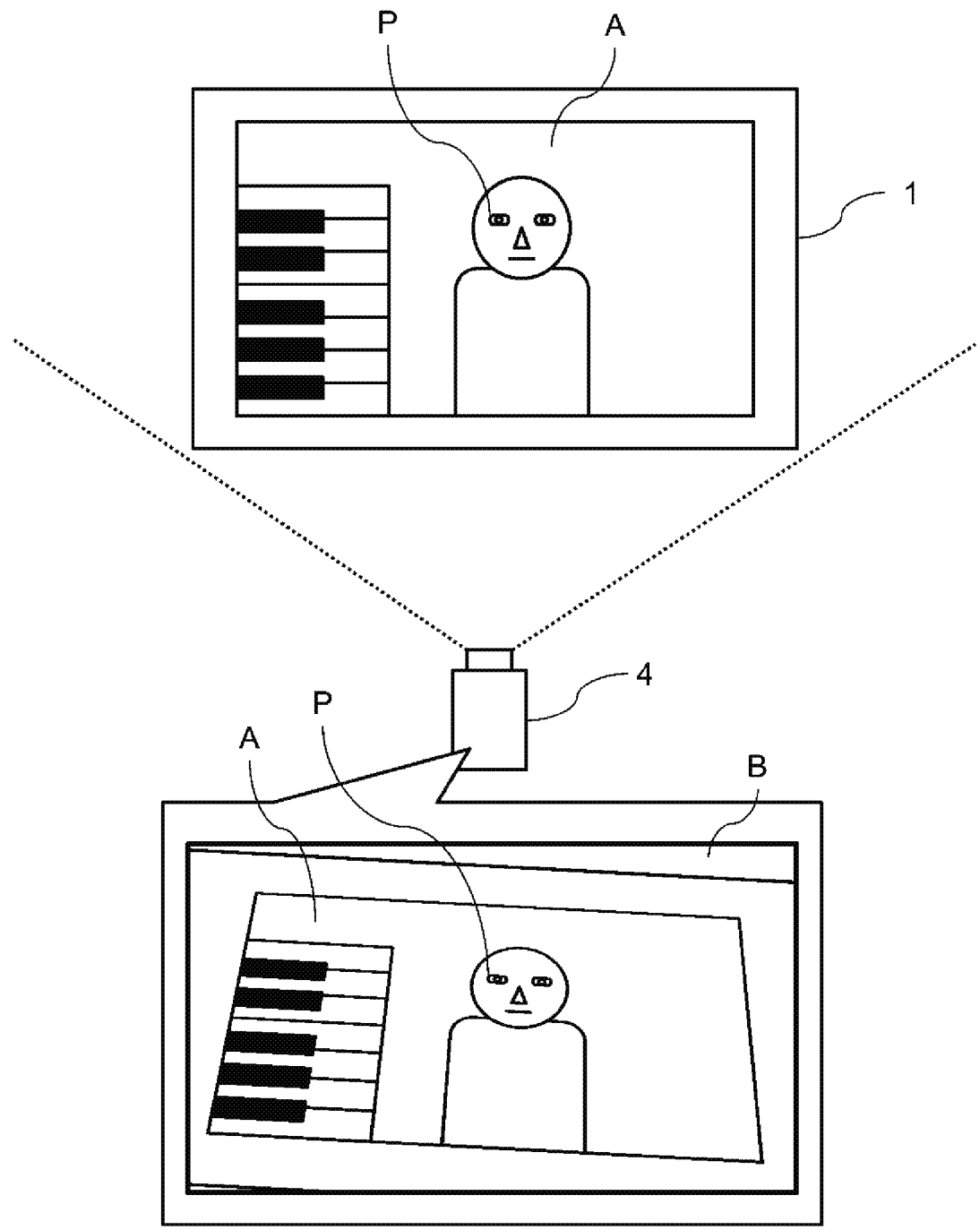
FIG. 22 is a diagram schematically illustrating a way in which a camera captures the first image displayed on the display.

Returning to FIG. 15, if the first image is displayed on the display 11 by the display control unit 13, the camera 4 generates a second image including the first image as a subject (for example, FIG. 22). FIG. 22 is a diagram schematically illustrating a form in which the camera 4 captures the first image displayed on the display 11. As illustrated in FIG. 22, the camera 4 captures a first image A displayed on the display 11 to generate a second image B including the first image A as a subject.

The conversion rule generation unit 15 acquires the second image generated by the camera 4 (S208). The conversion rule generation unit 15 detects the position of the display element of the first image in the second image by analyzing the second image (S210). For example, the first image A illustrated in FIG. 22 includes a plurality of feature points P in a display element such as the eye of a person, for example. As an example, firstly, the conversion rule generation unit 15 collates local feature values such as speeded up robust features (SURF) or scale-invariant feature transform (SIFT) between the two images, and thereby can detect the feature point P in the second image B. Thus, the position of the display element of the first image in the second image is determined.

The conversion rule generation unit 15 generates the coordinate conversion rule for converting the coordinates of an image generated by the camera 4 into the coordinates on the display 11 by using the detection position of the display element in the second image (S212). As an example, the conversion rule generation unit 15 acquires the position of each of the plurality of feature points in the first image, and performs comparison with the position of each of the plurality of feature points in the second image detected in the process of S210. It should be noted that, information indicating the position of each of the plurality of feature points in the first image is stored in the storage device 6A or the like in a state being associated with the first image, for example. The combination of the feature points to be compared between the first image and the second image is determined based on the above-described collation result. The conversion rule generation unit estimates a homography matrix H for converting coordinates on the first image into coordinates on the second image, based on a correspondence relation between the position of each of the plurality of feature points in the first image and the position of each of the plurality of feature points in the second image. For example, it is assumed that, for a certain feature point in the first image, the coordinates in the first image are $(x, y)$ and the coordinates in the second image are $(X, Y)$. In this case, the conversion rule generation unit 15 estimates the homography matrix H for converting the coordinates $(x, y)$ into the coordinates $(X, Y)$. It should be noted that, when the conversion rule generation unit 15 estimates the homography matrix H based on the collation result of the plurality of feature points, the conversion rule generation unit 15 may use a random sample consensus (RANSAC) algorithm, for example. The conversion rule generation unit 15 computes an inverse matrix $H^{-1}$ of the estimated homography matrix H. The conversion rule generation unit 15 stores the computed inverse matrix $H^{-1}$ in the memory 2A or the storage device 6A, as the coordinate conversion rule for converting coordinates on the second image into coordinates on the first image. It should be noted that, the conversion rule generation unit 15 may directly obtain the homography matrix for converting the coordinates (X, Y) in the second image into the coordinates (x, y) in the first image, based on the coordinates (x, y) in the first image and the coordinates (X, Y) in the second image.

In a case where an image as illustrated in FIGS. 18 and 19 is displayed on the display 11, the conversion rule generation unit 15 may generate the coordinate conversion rule, for example, in a manner as follows. Firstly, the conversion rule generation unit 15 acquires position coordinates of a reference point (for example, each grid point) of the first image, which is captured in the second image. It should be noted that, the conversion rule generation unit 15 may acquire the position coordinates of each grid point of the first image in the second image by using an image recognition algorithm such as template matching. The conversion rule generation unit 15 acquires the position coordinates of each grid point in the first image. It should be noted that, the position coordinates of each grid point in the first image are stored in advance in the storage device 6A, for example. The conversion rule generation unit 15 computes a homography matrix (coordinate conversion rule) for converting coordinates in the second image into coordinates in the first image, based on the position coordinates of each grid point in the first image and the position coordinates of each grid point of the first image in the second image.

In a case where the first image as illustrated in FIGS. 20 and 21 is displayed on the display 11, the conversion rule generation unit 15 may generate the coordinate conversion rule, for example, in a manner as follows. Firstly, the conversion rule generation unit 15 recognizes coordinate positions of reference points (marks a to d at four corners) in the first image, which are captured in the second image. It should be noted that, the conversion rule generation unit 15 may recognize the marks a to d at the four corners by using an image recognition algorithm such as template matching. The conversion rule generation unit 15 acquires the coordinate positions of the marks a to d at the four corners in the first image. It should be noted that, the coordinate positions of the marks a to d at the four corners in the first image are stored in advance in the storage device 6A, for example. The conversion rule generation unit 15 computes a homography matrix (coordinate conversion rule) for converting coordinates in the second image into coordinates in the first image, based on the correspondence relation between the position coordinates of the marks a to d at the four corners in the first image and the position coordinates of the marks a to d at the four corners of the first image in the second image.

As described above, according to the present example embodiment, it is possible to generate a coordinate conversion rule for converting coordinates in the second image into coordinates in the first image. Since the coordinate conversion rule is used, it is possible to display an analysis result (recognition result, recognition position, and the like of an object) of an image of the object placed on the display, on the display with being aligned with the position of the object.

As described above, the example embodiments of the some non-limiting embodiments have been described with reference to the drawings. However, the example embodiments are examples of the some non-limiting embodiments, and various configurations other than the above description can be employed.

In addition, in the plurality of flowcharts used in the above description, a plurality of steps (processes) are described in order, but the performing order of the steps performed in each example embodiment is not limited to the described order. In each example embodiment, the order of the illustrated steps can be changed within a range that does not hinder the contents. In addition, the above-described example embodiments can be combined in a range where the contents do not conflict with each other.

Some or all of the above example embodiments may be described as in the following supplementary notes, but are not limited thereto.

1. An information processing apparatus including:
    a display control unit that causes a display provided on a surface on which an object is placed, to display a first image including a predetermined display element; and
    a conversion rule generation unit that acquires a second image generated by an imaging apparatus having an imaging range including the display, and generates a coordinate conversion rule for converting coordinates in the image of the imaging apparatus into coordinates in the display by using a detection result of the display element in the second image.
2. The information processing apparatus according to 1, in which
    the conversion rule generation unit
        acquires a position of the display element in the first image and a position of the display element in the second image, and
        generates the coordinate conversion rule based on a correspondence relation between the position of the display element in the first image and the position of the display element in the second image.
3. The information processing apparatus according to 2, in which
    the display element includes a shape different from repetition of a specific pattern.
4. The information processing apparatus according to 2, in which
    the display element is a lattice-like pattern.
5. The information processing apparatus according to 2, in which
    the display element is a plurality of marks indicating positions of a plurality of vertexes of an area to which the coordinate conversion rule is applied on the display, respectively.
6. The information processing apparatus according to any one of 1 to 5, in which
    the display control unit causes the first image including the display element to be displayed in at least a portion of the area to which the coordinate conversion rule is applied on the display.
7. The information processing apparatus according to 6, in which
    the area to which the coordinate conversion rule is applied on the display is a portion of the display.
8. A display position adjustment method executed by a computer, the method including:

causing a display provided on a surface on which an object is placed, to display a first image including a predetermined display element;

acquiring a second image generated by an imaging apparatus having an imaging range including the display; and generating a coordinate conversion rule for converting coordinates in the image of the imaging apparatus into coordinates in the display by using a detection result of the display element in the second image.

9. The display position adjustment method executed by a computer described in 8, the method further including:

acquiring a position of the display element in the first image and a position of the display element in the second image; and generating the coordinate conversion rule based on a correspondence relation between the position of the display element in the first image and the position of the display element in the second image.

10. The display position adjustment method according to 9, in which the display element includes a shape different from repetition of a specific pattern.

11. The display position adjustment method according to 9, in which the display element is a lattice-like pattern.

12. The display position adjustment method according to 9, in which the display element is a plurality of marks indicating positions of a plurality of vertexes of an area to which the coordinate conversion rule is applied on the display, respectively.

13. The display position adjustment method executed by a computer according to any one of 8 to 12, the method further including:

causing the first image including the display element to be displayed in at least a portion of the area to which the coordinate conversion rule is applied on the display.

14. The display position adjustment method according to 13, in which the area to which the coordinate conversion rule is applied on the display is a portion of the display.

15. A program causing a computer to execute the display position adjustment method according to any one of 8 to 14.

This application claims priority based on Japanese Patent Application No. 2017-231436 filed on Dec. 1, 2017, the disclosure of which is incorporated herein in its entirety.

The invention claimed is:

1. An information processing apparatus comprising:
a display including a display surface on which information is displayed, wherein a product is placed on the display surface;
at least one memory configured to store instructions; and
at least one processor configured to execute the instructions to:
in response to determining that an operation on the display is not performed for a predetermined period, display a first image on the display, the first image including a display element;
acquire a second image captured by a camera having a field-of-view including the display, the second image including the display element of the first image displayed on the display;
detect the display element in the second image;
generate a coordinate conversion rule between the first image displayed on the display and the second image captured by the camera based on the display element as detected in the second image,
apply the coordinate conversion rule to an area of the display; and
display the first image including the display element within the area of the display to which the coordinate conversion rule has been applied, the area to which the coordinate conversion rule has been applied being a portion of the display.

2. The information processing apparatus according to claim 1,
wherein the at least one processor is further configured to:
acquire a position of the display element in the first image and a position of the display element in the second image; and
generate the coordinate conversion rule based on a correspondence relation between the position of the display element in the first image and the position of the display element in the second image.

3. The information processing apparatus according to claim 2,
wherein the display element includes a shape different from repetition of a specific pattern.

4. The information processing apparatus according to claim 2,
wherein the display element is a lattice-like pattern.

5. The information processing apparatus according to claim 2,
wherein the display element includes a plurality of marks indicating respective positions of a plurality of vertices of the area to which the coordinate conversion rule is applied on the display.

6. The information processing apparatus according to claim 1,
wherein the at least one processor is further configured to:
identify a product based on the second image.

7. The information processing apparatus according to claim 1,
wherein the at least one processor is further configured to:
display the display element on a vertex of the first image.

8. The information processing apparatus according to claim 1,
wherein the at least one processor is further configured to:
determine a placement position of a product on the display based on the coordinate conversion rule; and
display information indicating the placement position.

9. A display position adjustment method comprising:
in response to determining that an operation on a display is not performed for a predetermined period, displaying a first image on the display, the first image including a predetermined display element;
acquiring a second image captured by a camera having a field-of view including the display, the second image including the display element of the first image displayed on the display;
detecting the display element in the second image; and
generating a coordinate conversion rule between the first image displayed on the display and the second image captured by the camera based on the display element as detected in the second image;
applying the coordinate conversion rule to an area of the display; and
displaying the first image including the display element within the area of the display to which the coordinate conversion rule has been applied, the area to which the coordinate conversion rule has been applied being a portion of the display.

10. The display position adjustment method according to claim 9, further comprising:
  acquiring a position of the display element in the first image and a position of the display element in the second image; and
  generating the coordinate conversion rule based on a correspondence relation between the position of the display element in the first image and the position of the display element in the second image.

11. The display position adjustment method according to claim 10,
  wherein the display element includes a shape different from repetition of a specific pattern.

12. The display position adjustment method according to claim 10,
  wherein the display element is a lattice-like pattern.

13. The display position adjustment method according to claim 10,
  wherein the display element is a plurality of marks indicating respective positions of a plurality of vertices of the area to which the coordinate conversion rule is applied on the display.

14. The display position adjustment method according to claim 9, the method further comprising:
  determining a placement position of a product on the display based on the coordinate conversion rule; and
  displaying information indicating the placement position.

15. A non-transitory computer-readable storage medium storing instructions to cause a computer to execute operations comprising:
  in response to determining that an operation on a display is not performed for a predetermined period, displaying a first image on the display, the first image including a predetermined display element;
  acquiring a second image captured by a camera having a field-of view including the display, the second image including the display element of the first image displayed on the display;
  detecting the display element in the second image; and
  generating a coordinate conversion rule between the first image displayed on the display and the second image captured by the camera based on the display element as detected in the second image;
  applying the coordinate conversion rule to an area of the display; and
  displaying the first image including the display element within the area of the display to which the coordinate conversion rule has been applied, the area to which the coordinate conversion rule has been applied being a portion of the display.

16. The non-transitory computer readable medium according to claim 15,
  wherein the operations further comprise:
    determining a placement position of a product on the display based on the coordinate conversion rule; and
    displaying information indicating the placement position.

* * * * *